(12) United States Patent
Boggs et al.

(10) Patent No.: US 7,856,539 B2
(45) Date of Patent: Dec. 21, 2010

(54) METHOD REGARDING A DATA LOG RELATED TO A PROGRAMMABLE LOGIC CONTROLLER (PLC)

(75) Inventors: Mark Steven Boggs, Johnson City, TN (US); Steven Michael Hausman, Johnson City, TN (US); Temple Luke Fulton, Elizabethton, TN (US); William H. Johnson, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 80 days.

(21) Appl. No.: 11/899,114

(22) Filed: Sep. 4, 2007

(65) Prior Publication Data
US 2007/0300020 A1 Dec. 27, 2007

Related U.S. Application Data

(62) Division of application No. 10/685,821, filed on Oct. 15, 2003.

(60) Provisional application No. 60/436,252, filed on Dec. 23, 2002, provisional application No. 60/436,249, filed on Dec. 23, 2002.

(51) Int. Cl.
*G06F 13/00* (2006.01)
(52) U.S. Cl. .................... 711/154; 711/100; 711/161; 711/115; 714/15
(58) Field of Classification Search .............. 711/100, 711/115, 154, 161; 714/15
See application file for complete search history.

(56) References Cited

U.S. PATENT DOCUMENTS

| | | | |
|---|---|---|---|
| 4,281,392 A | 7/1981 | Grants | |
| 4,937,419 A | 6/1990 | Kolodziej | |
| 5,206,807 A * | 4/1993 | Hatke et al. | 600/484 |
| 5,226,145 A | 7/1993 | Moronaga | |
| 5,391,968 A | 2/1995 | Niwa | |
| 5,485,590 A * | 1/1996 | Hyatt et al. | 711/115 |
| 5,500,864 A | 3/1996 | Gonia | |
| 5,636,357 A | 6/1997 | Weiner | |
| 5,659,705 A | 8/1997 | McNutt | |
| 5,727,170 A | 3/1998 | Mitchell | |
| 5,765,000 A | 6/1998 | Mitchell | |
| 5,801,942 A | 9/1998 | Nixon | |
| 5,923,903 A | 7/1999 | Alvarez-Escurra | |
| 5,991,510 A | 11/1999 | Beaulieu | |
| 6,182,246 B1 | 1/2001 | Gregory | |
| 6,463,582 B1 * | 10/2002 | Lethin et al. | 717/158 |
| 6,473,749 B1 | 10/2002 | Smith | |
| 6,484,937 B1 | 11/2002 | Devaux | |

(Continued)

FOREIGN PATENT DOCUMENTS

GB 2319866 6/1998

(Continued)

*Primary Examiner*—Yong Choe
(74) *Attorney, Agent, or Firm*—Jose de la Rosa

(57) ABSTRACT

Certain exemplary embodiments can provide a method for utilizing a memory cartridge connected to a Programmable Logic Controller (PLC). The memory cartridge can comprise a plurality of memory segments. The method can comprise a plurality of activities comprising: providing a default identifying stamp for records in a data log file, a structure for the data log file stored separately from the data log file in the memory cartridge, and obtaining a request to provide the data log file.

19 Claims, 9 Drawing Sheets

U.S. PATENT DOCUMENTS

| | | |
|---|---|---|
| 6,631,478 B1 * | 10/2003 | Wang et al. .................... 714/15 |
| 6,826,432 B2 | 11/2004 | Beck |
| 7,203,553 B2 | 4/2007 | Fulton |
| 2001/0034728 A1 | 10/2001 | McBride |
| 2002/0083281 A1 * | 6/2002 | Carteau ....................... 711/161 |
| 2002/0188870 A1 * | 12/2002 | Gong et al. ................. 713/201 |
| 2003/0051142 A1 * | 3/2003 | Hidalgo et al. .............. 713/176 |
| 2003/0100958 A1 | 5/2003 | Cachat |

FOREIGN PATENT DOCUMENTS

| | | |
|---|---|---|
| WO | WO 97/49018 | 12/1997 |
| WO | WO 01/50209 | 7/2001 |

* cited by examiner

METHOD REGARDING A DATA LOG RELATED TO A PROGRAMMABLE LOGIC CONTROLLER (PLC)

CROSS-REFERENCES TO RELATED APPLICATIONS

This application is a divisional of, claims priority to, and incorporates herein by reference in its entirety, pending U.S. Non-Provisional Patent Application 10/685,821 titled "Method for Utilizing a Memory Device for a Programmable Logic Controller (PLC)", filed Oct. 15, 2003, which claims priority to the following U.S. Provisional Patent Applications:

60/436,252, filed Dec. 23, 2002, and
60/436,249, filed Dec. 23, 2002.

BACKGROUND

Commercially available programmable logic controllers (PLC's) can be supplied with a memory device for storage. The memory device, which can be a memory cartridge, is most often an electronically erasable programmable read only memory (EEPROM) device. Common methods of using the memory cartridge include the storage of PLC configuration and programming information.

U.S. Pat. No. 5,727,170 (Mitchell) allegedly cites: "[t]he PLC has a user configurable protocol port attached thereto. Briefly stated, at the PLC communication port or as a result of a user program or I/O event, a special flag bit may be set which thereby allows the communication port to be activated. This is done by the flag bit causing an interrupt to occur in the PLC user program which allows a user to communicate with a user specified protocol scheme rather than the normal communication/programming protocol when this special bit is not set." See Abstract.

U.S. Pat. No. 5,485,590 (Hyatt) allegedly cites: "[a] module interfaces a programmable controller to several serial communication networks over which data may be exchanged according to different protocols. A module has a central controller and a separate port circuit for each of the networks. Each port circuit includes a microprocessor and a shared memory to which both the central controller and the port microprocessor have access for the exchange of data. The central controller transfers data from the shared memories to a module output coupled to other components of the programmable controller. A removable memory cartridge stores a plurality of programs for execution by the port microprocessors to exchange data over the networks using different communication protocols. Configuration data is stored in the module defining which program is to be transferred from the memory cartridge into the shared memory of each port circuit. Protocol parameter configuration inquiries are stored for each program so that the user can be queried to select values for the parameters of the communication protocol used by the program." See Abstract.

U.S. Pat. No. 5,991,510 (Beaulieu) allegedly cites "A robot drive has operating and configuration parameters at an installation location stored in an easily removable storage device on the drive, or nearby, so that special data, such as that associated with arm design and system layout, including taught stations, can remain associated with the drive and installation whereby the drive system can be installed or replaced in minimal time since the storage device does not need reprogramming. This removable storage device, in the form of a static memory or Master Key, e.g., a Dallas Key or E Prom or the like, may be affixed to the robot body or off board nearby, and may store arm design parameters, programmed while on the robot body or off-line, and becomes a unique part structured for manufacturing with respect to the arm set design. Further, nominal system layout parameters can be prestored in the Key, and when this Key is affixed to the robot drive, the robot automatically has the information regarding both arm design and system layout, which will help avoid collisions and provide a starting point for the fine teaching of the transfer stations. Additionally, the fine location parameters for each transfer station may be stored in the Key when the robot is installed. Thus, the Key will contain all the information needed to make a robot unique to a unique system, and when a robot drive is replaced, by affixing the original Key to the new robot or nearby, it will assume all of the parameters of the initial robot." See Abstract.

U.S. Pat. No. 4,937,419 (Kolodziej) allegedly cites "[a] programmable weld and machine controller for use in controlling a welding machine. The controller includes a central processing unit containing a stored control program connected to a memory which operates both the welding operation of the machine as well as the operation of the machine itself. The controller receives inputs from the machine in its various operational states as well as a data entry and display unit and a current monitor of the welding operation which generates outputs through a heat controlled output to activate a firing circuit to control the welding operation. Back-up of the memory program may be attained through an accessory port to a memory back-up storage unit." See Abstract.

SUMMARY

Certain exemplary embodiments can provide a method for utilizing a memory cartridge connected to a PLC. The memory cartridge can comprise a plurality of memory segments. The method can comprise a plurality of activities comprising: providing a default identifying stamp for records in a data log file, a structure for the data log file stored separately from the data log file in the memory cartridge, and obtaining a request to provide the data log file.

BRIEF DESCRIPTION OF THE DRAWINGS

The invention and its wide variety of potential embodiments will be more readily understood through the following detailed description, with reference to the accompanying drawings in which.

DETAILED DESCRIPTION

As used herein, an I/O device can comprise any sensory-oriented input and/or output device, such as an audio, visual, tactile (including temperature, pressure, pain, texture, etc.), olfactory, and/or taste-oriented device, including, for example, a monitor, display, keyboard, keypad, touchpad, pointing device, microphone, speaker, video camera, camera, scanner, and/or printer, potentially including a port to which an I/O device can be attached or connected.

As used herein, render means made perceptible to a human, for example as data, commands, text, graphics, audio, video, animation, and/or hyperlinks, etc., such as via any visual and/or audio means, such as via a display, a monitor, electric paper, an ocular implant, a speaker, a cochlear implant, etc.

As used herein, an information device can be any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, etc.

Figure 9:
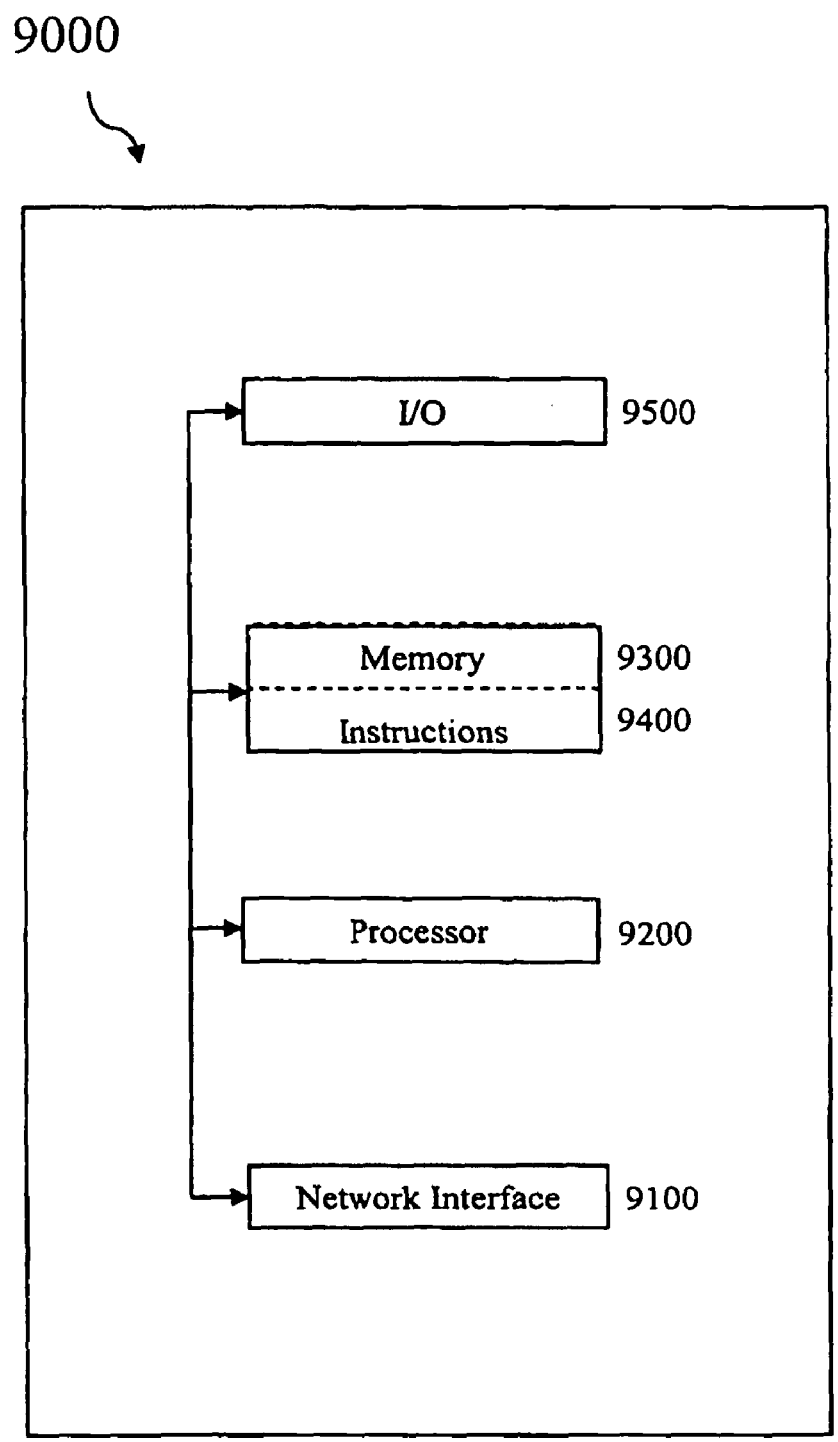
FIG. 9 is a block diagram of an exemplary embodiment of an information device 9000.

FIG. 9 is a block diagram of an exemplary embodiment of an information device 9000. Information device 9000 can comprise a network interface 9100. Network interface device 9100 can comprise a telephone, a cellular phone, a cellular modem, a telephone data modem, a fax modem, a wireless transceiver, an ethernet card, a cable modem, a digital subscriber line interface, a bridge, a hub, a router, or other similar device. Information device 9000 can be connectable directly and/or indirectly to other information devices via network interface 9100.

Information device 9000 can further comprise a processor 9200. Processor 9200 can be a central processor, a local processor, a remote processor, parallel processors, and/or distributed processors, etc. The processor can be a general purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein. Processor 9200 can make information device 9000 adaptable to perform according to a plurality of instructions.

Information device 9000 can further comprise a memory 9300. Memory 9300 can comprise any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted for execution by the processor according to an embodiment disclosed herein. Memory 9300 can be adaptable to store instructions 9400.

Instructions 9400 can comprise a plurality of instructions written in a machine readable language. Instructions 9400 can be adaptable to process information when executed by processor 9200. In an operative embodiment, information used by processor 9200 using instructions 9400 can provide information to and/or be modified by the processing operation.

Information device 9000 can further comprise an I/O device 9500. I/O device 9500 can be adaptable to allow information device 9000 to communicate directly and/or indirectly with other information devices and/or users.

Figure 1:
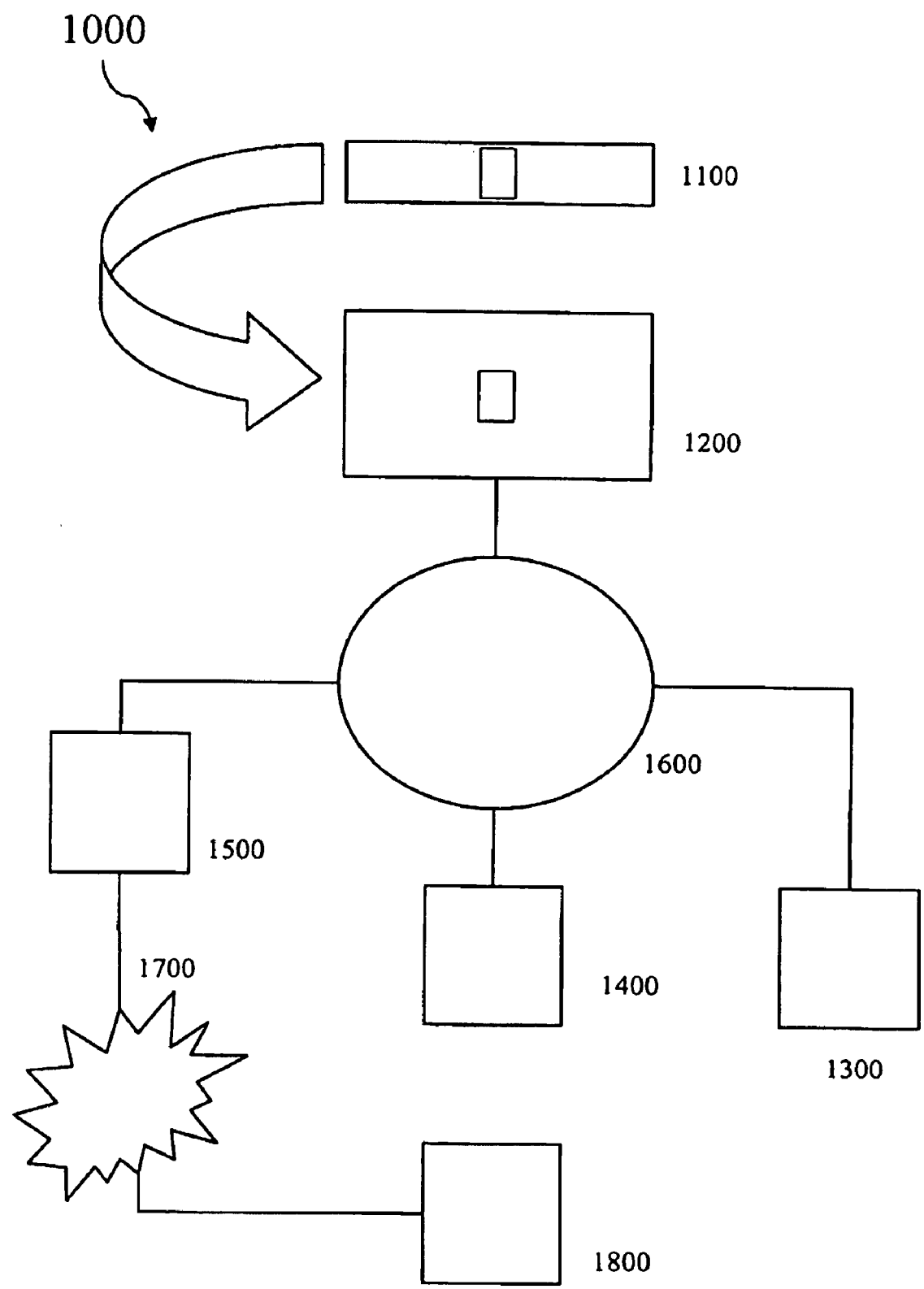
FIG. 1 is a block diagram of an exemplary embodiment of a system 1000.

FIG. 1 is a block diagram of an exemplary embodiment of a system 1000. As illustrated, system 1000 can comprise a controller, such as a programmable logic controller (PLC) 1200. System 1000 can comprise a machine and/or process monitorable and/or controllable by PLC 1200. System 1000 can further comprise hardware and/or software adaptable to allow a user to communicate with PLC 1200. PLC 1200 can be a commercially purchased PLC. Alternatively, PLC 1200 can be an information device. PLC 1200 can be used to monitor and/or control a process, such as an industrial process. For example, PLC 1200 can monitor and/or control an alarms indicator, relay, sensor, another controller, and/or a motion device, such as a motion controller, such as a stepper motor controller, a servo controller, an actuator controller, etc.; a motion drive, such as a stepper drive, servo drive, etc.; and/or an actuator, such as a stepper motor, servomotor, linear motor, motor, ball screw, servo valve, hydraulic actuator, pneumatic valve, etc.

PLC 1200 can include a central processing unit (CPU) via which instructions are processed and appropriate control signals determined. PLC 1200 can further comprise and/or be coupled to an input-output (I/O) device. The I/O device can render information obtained from PLC 1200. The user also can interact with PLC 1200 via the I/O device. As used herein interact means receiving alerts or notifications, revising or switching programs, examining control algorithms, and/or modifying graphics displays, etc.

A memory device, such as a memory cartridge 1100 can be couplable to PLC 1200, either directly or via a network. In certain embodiments, memory cartridge 1100 can be insertable into PLC 1200 and/or directly connectable to PLC 1200. The memory device can be non-volatile memory, volatile memory, ROM, random access memory, flash memory, magnetic media, a hard disk, a floppy disk, a magnetic tape, an optical media, an optical disk, a CD, a DVD, and/or a raid array, etc. The memory device can provide storage for instructions or data usable by the PLC's CPU.

In an exemplary embodiment, PLC 1200 can be couplable to a user interface device 1300 via a network 1600. Network 1600 can be a public, private, circuit-switched, packet-switched, virtual, radio, telephone, cellular, cable, DSL, satellite, microwave, AC power, twisted pair, ethernet, token ring, LAN, WAN, Internet, intranet, wireless, Wi-Fi, Blue-Tooth, Airport, 802.11a, 802.11b, 802.11g, and/or any equivalents thereof, etc.

Via user interface device 1300, the user can interact with PLC 1200. User interface device 1300 can be an information device. For example, via user interface device 1300, the user can monitor a process, connectable to and/or controllable by PLC 1200. The user also can interact with PLC 1200 via user interface device 1300.

Via network 1600, PLC 1200 can be further couplable to a process element 1400. Process element 1400 can comprise a machine tool, a robot, a chemical reactor, a stove, a furnace, an assembly machine, a packaging machine, and/or piece of conveying equipment, etc. In an operative embodiment, process element 1400 can be controlled, influenced, and/or monitored via PLC 1200.

The PLC can be further communicable with the user via network interface device 1500. Network interface device 1500 can be a telephone, a cellular phone, a modem, a cellular modem, a telephone data modem, a fax modem, a wireless transceiver, an ethernet card, a cable modem, a digital subscriber line interface, a bridge, a hub, a router, or other similar device. Network interface device 1500 can be adaptable to allow the user to communicate with PLC 1200 while located remotely from the PLC 1200. Via a network interface device 1500, network 1600 can be further couplable to a peripheral network 1700. Peripheral network 1700 can be a public, private, circuit-switched, packet-switched, virtual, radio, telephone, cellular, cable, DSL, satellite, microwave, AC power, twisted pair, ethernet, token ring, LAN, WAN, Internet, intranet, wireless, Wi-Fi, BlueTooth, Airport, 802.11a, 802.11b, 802.11g, and/or any equivalents thereof, etc. etc.

Peripheral network 1700 can be further connectable to a remote user interface device 1800. Remote user interface device 1800 can be an information device comprising an I/O device. In an operative embodiment, peripheral network 1700 can be adapted to allow the user to interact with PLC 1200. Peripheral network 1700 can allow the user to interact with PLC 1200 from a location hundreds or even thousands of miles away from PLC 1200. Peripheral network 1700 can be usable to enhance availability and reduce programming, managerial, and/or maintenance costs attributable to PLC 1200 and/or the monitoring and/or control of process element 1400. Process element 1400 can be one of a plurality of process elements.

Figure 2:
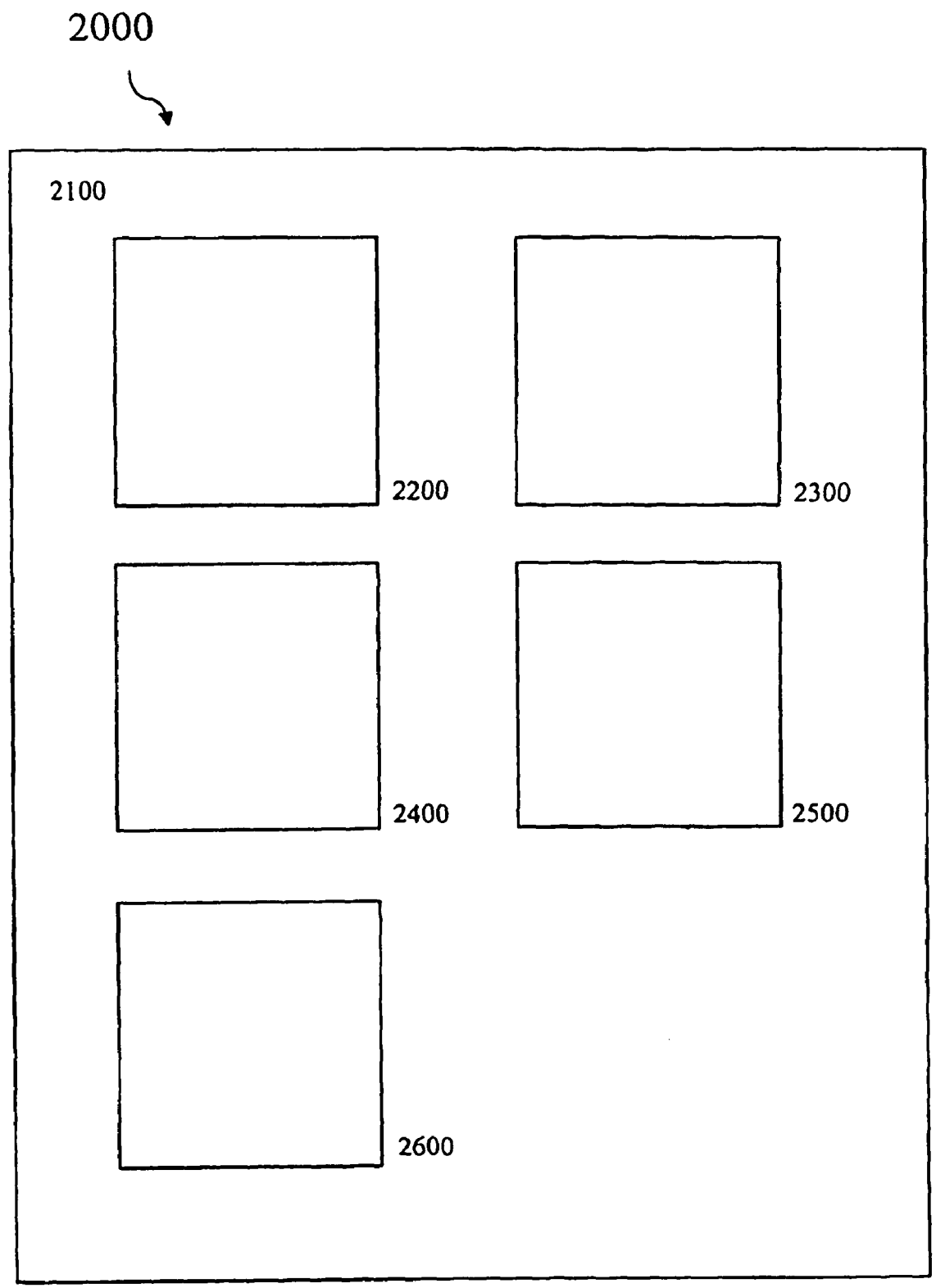
FIG. 2 is a block diagram of an exemplary embodiment of a data structure 2000.

FIG. 2 is a block diagram of an exemplary embodiment of a data structure 2000. An exemplary embodiment of data structure 2000 can comprise a project file 2100. Project file 2100 can be storable on a memory device, such as the memory cartridge. Project file 2100 can comprise a program 2200, a recipe 2300, information indicative of a data log file structure 2400, information indicative of a recipe structure 2500, and/or a support document 2600, etc. Data log file structure 2400 can be stored separately from a corresponding data log file, which can be stored on any memory device. Recipe structure 2500 can be stored separately from a corresponding recipe 2300. Project file 2100, and/or one or more elements thereof, can be adaptable to allow the PLC to monitor and/or control a process element.

Program 2200 can comprise a set of machine-readable instructions. Program 2200 can be transferable to the PLC. Program 2200 can be executable on the PLC. Program 2200 can be storable in project file 2100. In an operative embodiment, program 2200 can be adapted and/or adaptable to facilitate the performance of tasks by the PLC such as displaying a process flow, transferring information, storing information, processing information, prompting a user for input, controlling a process variable, and/or reporting a process output, etc.

Recipe 2300 can comprise at least one of a plurality of input values, each input value from the plurality of input values corresponding to a process variable. Each process variable can be used to monitor and/or control a process via a PLC. Recipe 2300 can comprise values for settings such as: machine speed, machine size, product type, product composition, product size, product labeling, package type, package size, package labeling, a pressure, a temperature, and/or any other relevant process parameter. Recipe 2300 can be storable in project file 2100. Recipe 2300 can be communicable to provide settings to program 2200 in order to render a product makable and/or a process operable using the PLC. Alternatively, recipe 2300 can be communicable to a different processing device and/or software to provide settings to render a product makable and/or process operable.

Information indicative of the data log structure 2400 can comprise a symbolic representation of how a data log file is formatted for storage and retrieval. Information indicative of the data log file structure 2400 can be storable in project file 2100. Information indicative of the data log file structure 2400 can comprise a series of values and/or characters correlatable to structural characteristics of the data log file. The data log file and/or the information indicative of the data log structure 2400 can be storable on the memory cartridge or on another memory device. Information indicative of the data log file structure 2400 can be adaptable to render the data log file machine-storable and/or machine-readable. Information indicative of the data log file structure 2400 can be storable separately from the data log file.

Information indicative of the recipe structure 2500 can comprise a symbolic representation of how the recipe is formatted for storage and retrieval. Information indicative of the recipe structure 2500 can be storable in project file 2100. Information indicative of the recipe structure 2500 can comprise a series of values and/or characters correlatable to structural characteristics of the recipe. Information indicative of the recipe structure 2500 can be adaptable to render the recipe machine-storable and/or machine-readable. Information indicative of the recipe structure 2500 can be storable separately from the recipe.

Support document 2600 can comprise a textual and/or visual representation of information assimilatable to improve understanding of the PLC, the memory cartridge, hardware components related to the PLC, software components related to the PLC, and/or the controlled process, etc. Support document 2600 can be storable in project file 2100. In an exemplary embodiment, support document 2600 can be reviewable by the user at the user interface device in order to facilitate understanding and/or modifying the PLC, hardware related to the PLC, software related to the PLC, the process, the project file, the data log file, information indicative of the structure of the data log file, the recipe, and/or information indicative of the structure of the recipe, etc. Alternatively, support document 2600 can be rendered to the user via an I/O device connectable to an information device.

Figure 3:
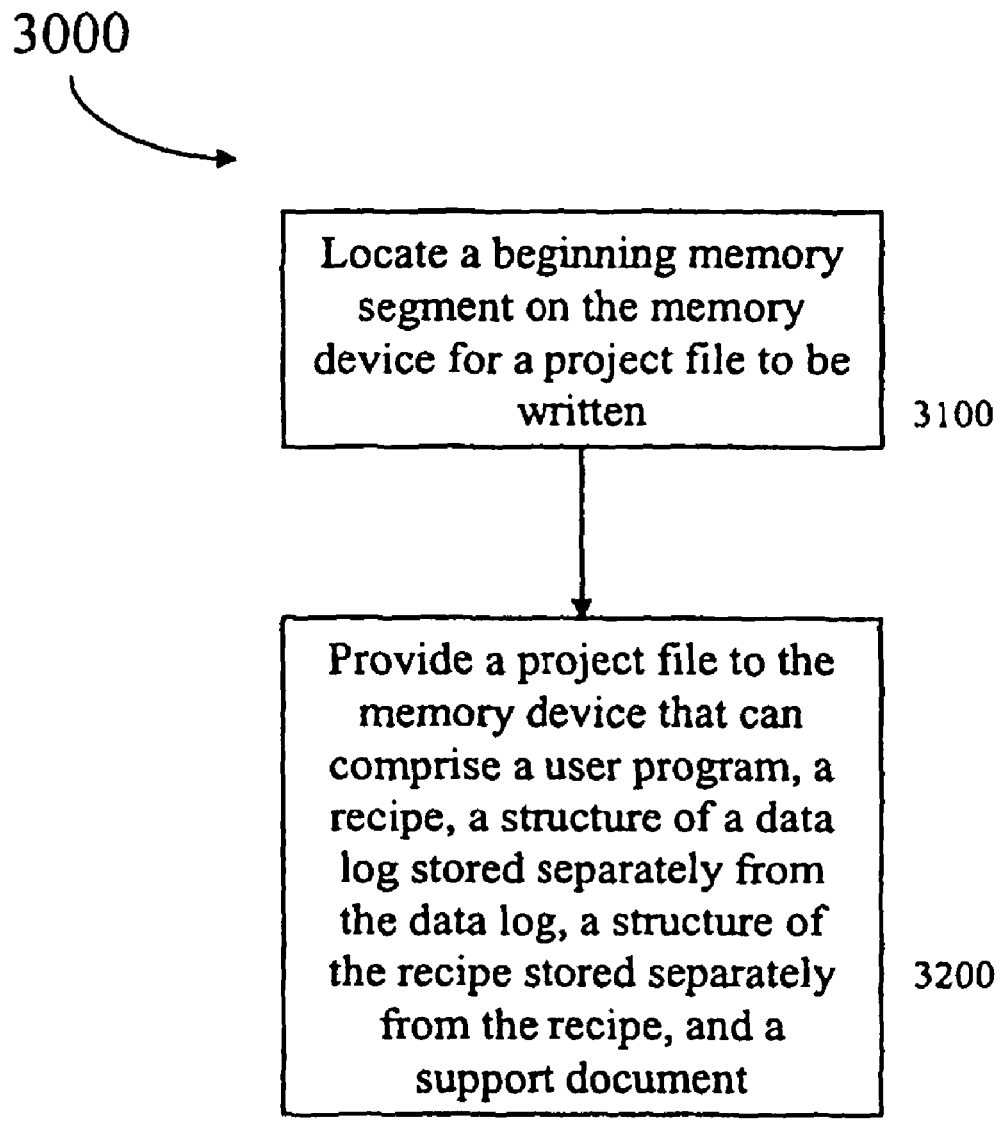
FIG. 3 is a flowchart of an exemplary embodiment of a method 3000.

FIG. 3 is a flowchart of an exemplary embodiment of a method 3000 for using the memory device. At activity 3100, a beginning memory segment on the memory cartridge can be located where the project file or any component thereof can be read from and/or written. Alternatively, the beginning memory segment can be located on the memory device. In an operative embodiment, the project file can occupy a single memory segment. Alternatively, in an operative embodiment, the project file can occupy a plurality of memory segments. At activity 3200, the project file can be provided to the memory cartridge. Alternatively, the project file can be provided to the memory device. Providing the project file to the memory device can allow information contained in the project file to be subsequently transferred to the PLC. For example, in case of a power failure erasing volatile memory in the PLC, certain information erased from volatile memory can be restorable from the project file stored in the memory device.

Figure 4:
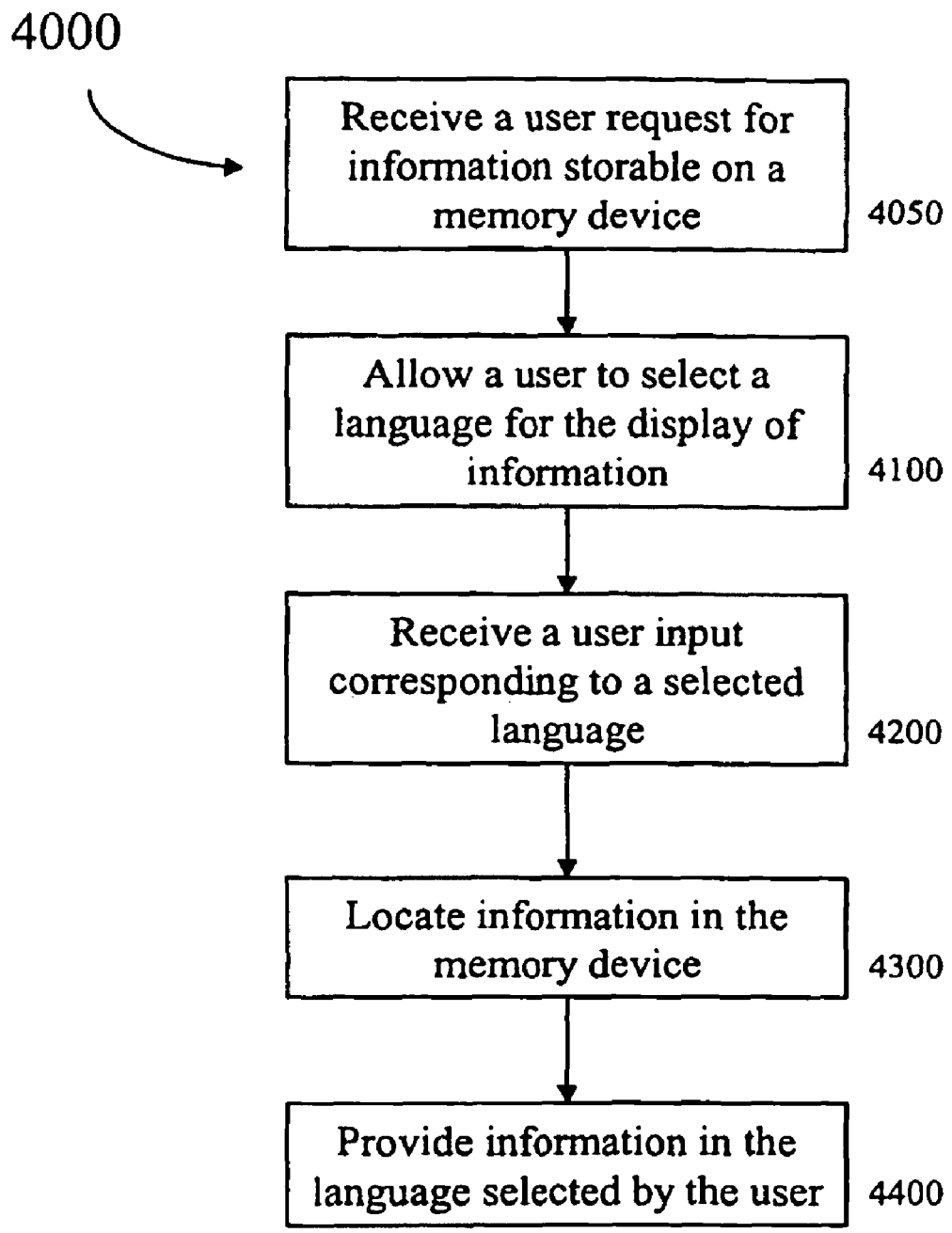
FIG. 4 is a flowchart of an exemplary embodiment of a method 4000.

FIG. 4 is a flowchart of an exemplary embodiment of a method 4000 for using the memory device. At activity 4050, the user can request to obtain (e.g., view, hear, have rendered, and/or obtain access to) information stored and/or storable on a memory device. The information can comprise programming code, programming code documentation, support documentation pertaining to hardware and/or software relatable to the PLC, process data, recipe code, and/or recipe information, one or more data logs, etc. The user can potentially improve monitoring, control, and/or management of the PLC and/or at least one process element with the obtained information.

At activity 4100, the user can be prompted to select a language for rendering the information from a plurality of language choices. The user can be allowed to provide a selection corresponding to a selected language. The user can be allowed to make a selection on an I/O device connectable to an information device. Language choices can comprise any language, such as English, German, French, Italian, Spanish, and/or Chinese, etc. The user can select the language by providing a user input corresponding to a selected language.

At activity 4200, the user input can be received corresponding to a selected, language. The user input can be received as a result of a user interacting with an I/O device connected to an information device. The user input can improve communicability of information to and/or from the PLC via transferring the information in a language favored and/or better understood by the user.

At activity 4300, the information can be located on the memory device. The information can be located by the actions of the PLC or any information device directly and/or indirectly connectable to the PLC. Locating the information can facilitate communications between the user and the PLC.

At activity 4400, the information can be provided to the user responsive to the user input corresponding to the selected language. The information can be provided, in the selected language, to the user interface device. Alternatively, the information can be provided, in the selected language, to any I/O device and/or any information device.

Figure 5:
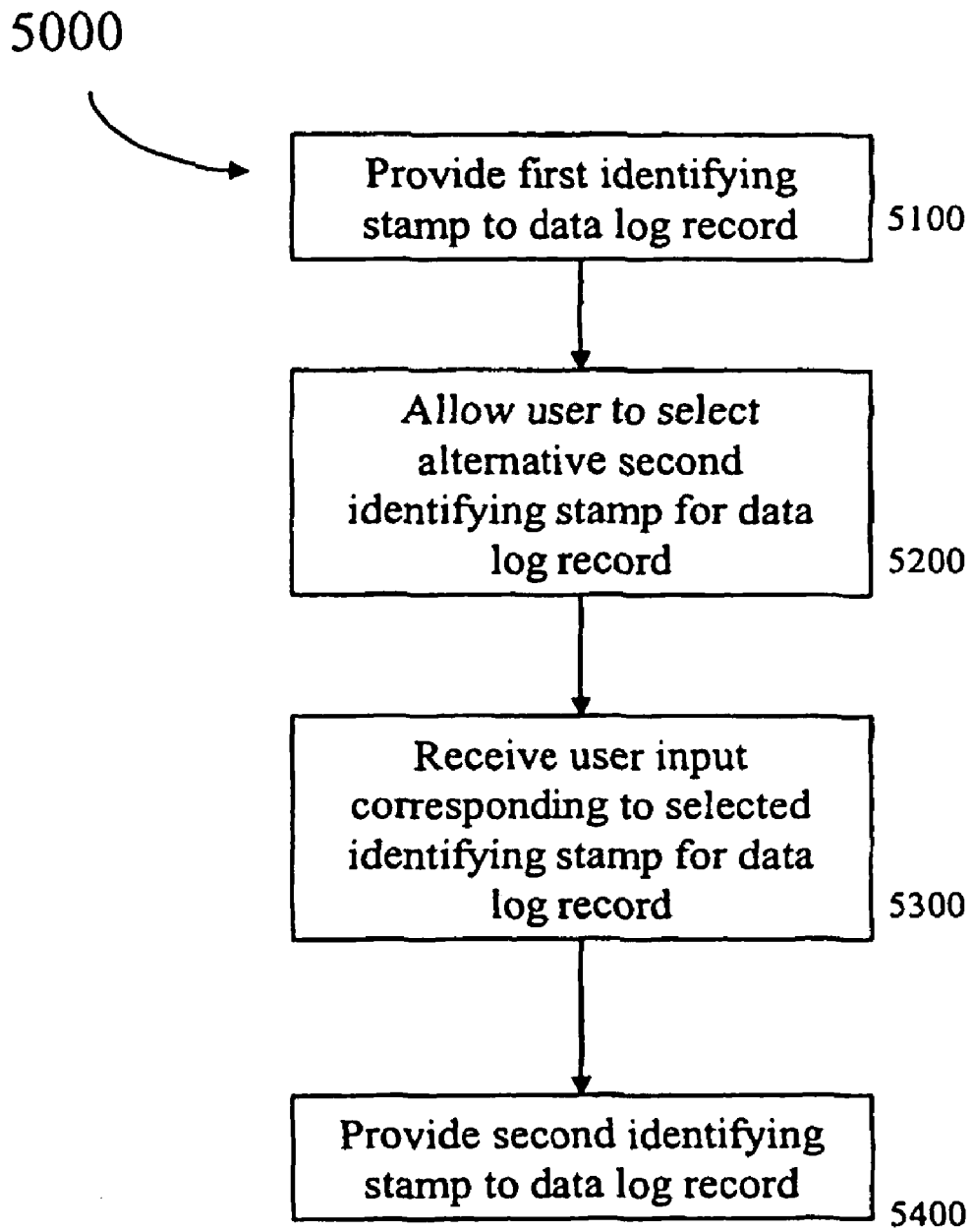
FIG. 5 is a flowchart of an exemplary embodiment of a method 5000.

FIG. 5 is a flowchart of an exemplary embodiment of a method 5000 for using the memory device. At activity 5100, a first identifying stamp can be provided for a data log record. The first identifying stamp can comprise a calendar date and/or a clock time associated with requesting, collecting, receiving, and/or recording the data log record. Alternatively, the first identifying stamp can relate to a process unit, such as a machine, instrument, and/or device, etc., associated with a data log record. For example, the first identifying stamp can be a process unit identifier, such as a machine number, a sensor number, and/or an actuator number, etc. In an operative embodiment, the process identifying stamp can assist the user in analyzing and categorizing data log records.

At activity 5200, the PLC can allow the user to select a second identifying stamp from a plurality of choices. Identifying stamp choices can comprise various date and/or time elements comprising a year, a month, a day, a day of week, an hour, a time zone, a minute, a second and/or a portion of a second, etc. Alternatively, the second identifying stamp can comprise various numbers and/or symbols relatable to the process unit.

At activity 5300, a user input corresponding to a selection of the second identifying stamp can be received from the selection device. The second identifying stamp can improve the user's ability to analyze the process log record. Alternatively, the second identifying stamp can reduce storage space requirements for a data log record by providing a smaller second identifying stamp as compared to the first identifying stamp.

At activity 5400, the selected second identifying stamp can be provided to the memory device responsive to the user input. In an operative embodiment providing the second identifying stamp to the memory device can supply information to the user, when the user subsequently analyzes the data log record, information within the second identifying stamp can be adaptable to improve the efficiency of analyzing, sorting, and/or otherwise processing information in the data log record.

Figure 6:
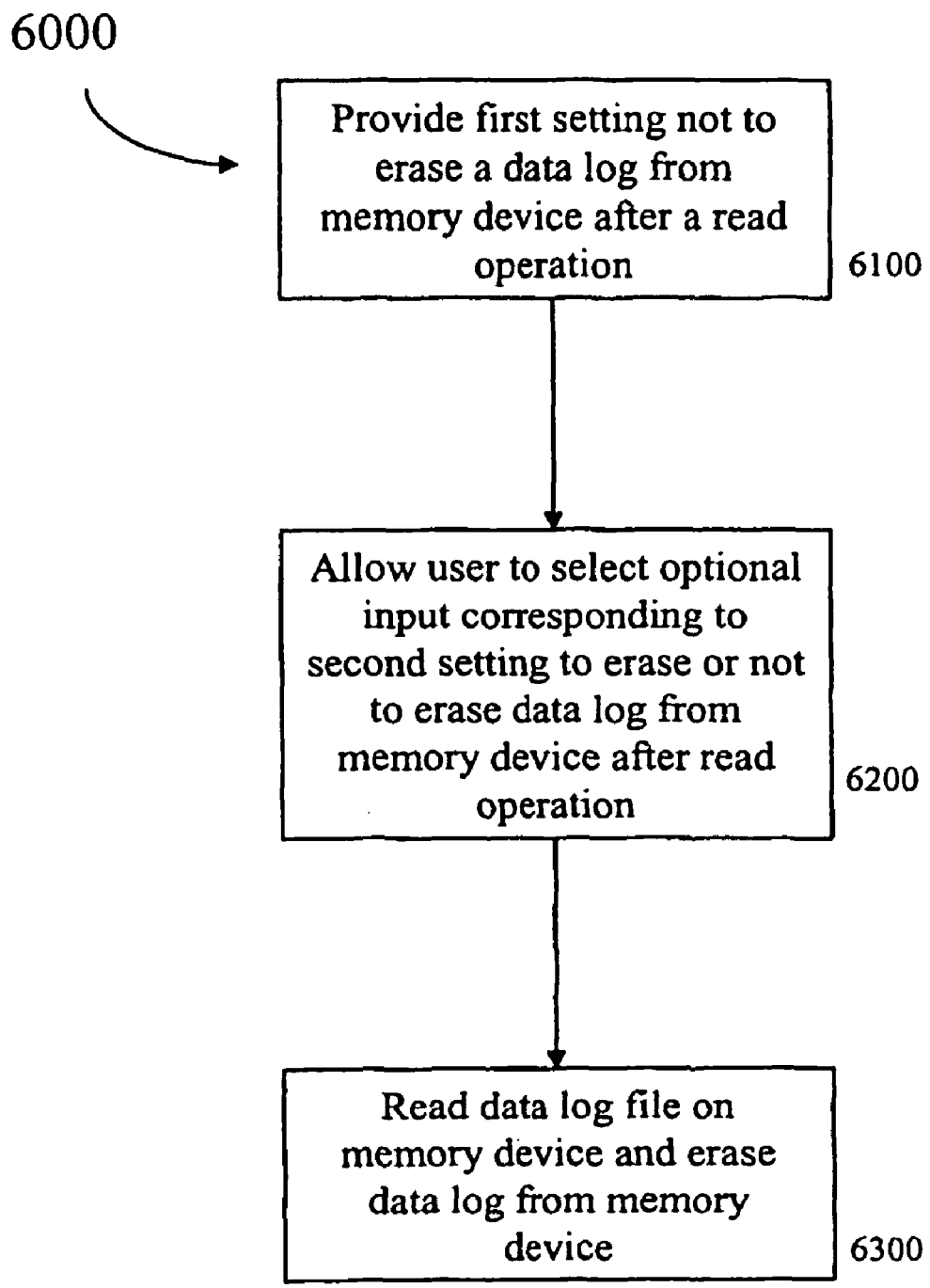
FIG. 6 is a flowchart of an exemplary embodiment of a method 6000.

FIG. 6 is a flowchart of an exemplary embodiment of a method 6000 for using the memory device. At activity 6100, a first setting can be provided corresponding to an instruction to erase or to not erase the data log from the memory device after the data log is read. The instruction to erase or not erase the data log file subsequent to reading the data log file can allow a user to more effectively manage data storage and retrieval on the memory device. Erasing the data log file can provide an assurance that no data log record on the memory device has been previously read.

At activity 6200, the user can be allowed to select a second setting corresponding to an instruction to erase or to not erase the data log from the memory device after the data log is read. The second setting can provide instructions contrary to the first setting. Providing the second setting can allow the user improved control over data storage resources.

At activity 6300, the data log can be read from the memory device. The data log can then be erased or not erased from the memory device responsive to the user input. Reading the data log can allow the user to transfer information for additional processing and/or storage responsive to needs to analyze and/or improve the monitoring, control, and/or reporting of the process element controllable by the PLC.

Figure 7:
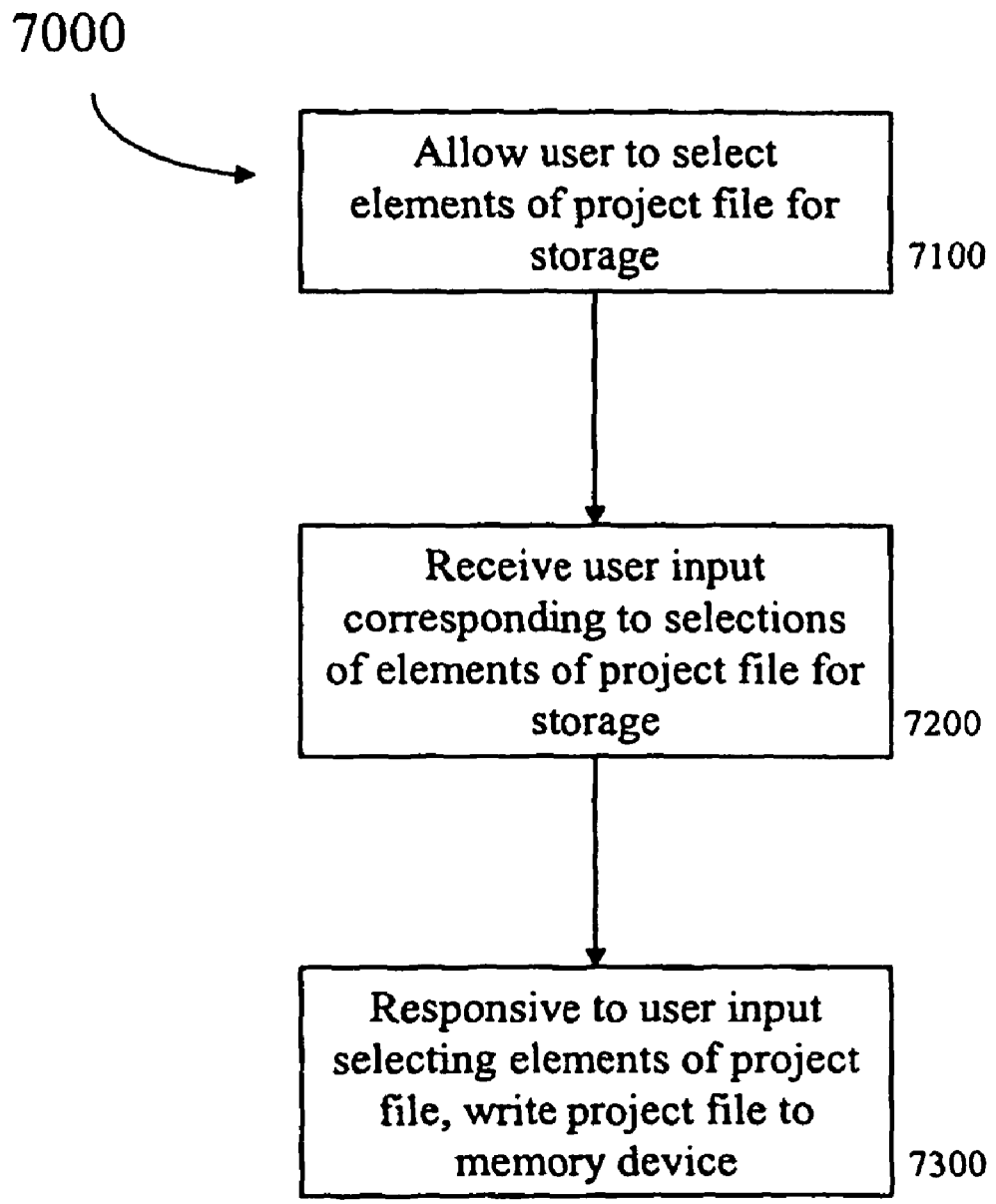
FIG. 7 is a flowchart of an exemplary embodiment of a method 7000.

FIG. 7 is a flowchart of an exemplary embodiment of a method 7000 for using the memory device. At activity 7100, the user can be prompted allowed to select elements of a project file for storage on the memory device. The selectable elements can comprise the project file, the program, the recipe, information indicative of the recipe structure, information indicative of the data log file structure stored separately from the data log file, and/or support documentation pertaining to the process, the PLC, hardware related to the PLC, and/or software related to the PLC.

At activity 7200, a user input corresponding to an option to store at least one project file element can be received from the selection device. Providing the user with storage options can allow the user to customize a storage plan to suit unique system requirements taking into consideration such factors as: other means for storing the project file, the size of the memory cartridge, the amount of process data collected for storage in the data log file, the frequency of storing process data collected for storage in the data log file, the number of recipes storable in the memory device, and/or the amount and/or content of support documentation available, etc.

At activity 7300, project file elements can be written to the memory device responsive to the user input. The project file elements can be written beginning at a vacant memory segment. Alternatively, project file elements can overwrite a previously stored project file.

Figure 8:
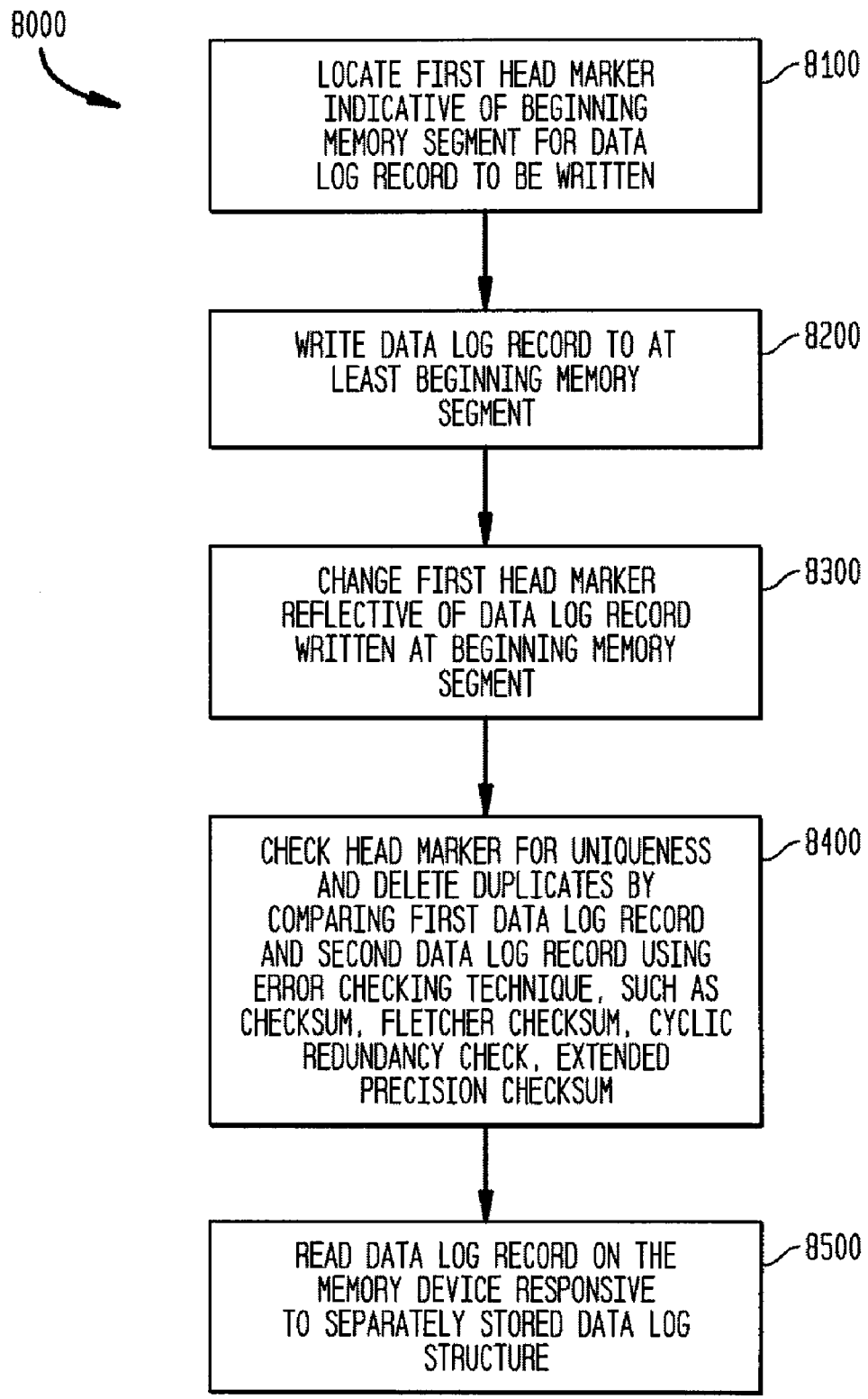
FIG. 8 is a flowchart of an exemplary embodiment of a method 8000.

FIG. 8 is a flowchart of an exemplary embodiment of a method 8000 for using the memory cartridge. A data log file is provided to the memory cartridge. At activity 8100, a first head marker, indicative of a beginning memory segment for a data log record to be written, can be located on the memory device. The data log record can be of a size storable on a single memory segment. Alternatively, the data log record can be of a size storable on a plurality of memory segments. Memory segments usable for data log storage can be spatially and/or logically contiguous, and/or can be writable sequentially.

At activity 8200, the data log record, which can comprise a second head marker, can be written to at least the beginning memory segment. The data log record can be written on at least one vacant memory segment. Alternatively, the data log record can overwrite at least one memory segment used by an older data log record. The second head marker can contain information reflective of a location of a next memory segment for storage of a next data log record. In an exemplary embodiment, the data log file can be written in a logically circular buffer. The logically circular buffer can be characterized by data log records written to contiguous memory segments, the buffer commencing at a beginning memory segment. The logically circular buffer can be further characterized by the writing of the next data log record at the beginning of the buffer when the buffer is full. The next data log record can overwrite an oldest data log record written in the logically circular buffer. For example, if the buffer is full, the next data log record to be written can be written at the beginning of the buffer, thereby overwriting the data log record that was previously at the beginning of the buffer. The logically circular buffer can comprise a circular buffer wherein memory segments are physically contiguous to each other.

At activity 8300, the first head marker can be changed to a record marker reflective of the data log record written in at least the beginning memory segment. The record marker, as changed, can be indicative of the successful writing of the data log record comprising the second head marker.

After activity 8200 and before completing activity 8300, a power failure might occur. A power failure occurring before activity 8300 is fully completed can leave a data log file with two head markers turned on simultaneously. At activity 8400, in an operative embodiment, the PLC can assure the presence of a single head marker after the power failure, via an error checking technique. The error checking technique can be an ones complement method, a Fletcher checksum method, a cyclic redundancy check method, and/or extended-precision checksum method, etc. The first data log record on the memory cartridge is compared to a second data log record on the memory cartridge using an error checking technique. The error checking technique, possibly coupled with knowledge of the position of the records in question and/or the position and or direction that records are added to the memory device, can identify which record is the most recent, and thereby which head marker is erroneous.

In an operative embodiment, the PLC can disable and/or eliminate the older, duplicate head marker, or possibly convert the older, duplicate head marker to a non-head marker resulting in the presence of a single head marker in the data log file, that single head marker corresponding to the new record. Changing the value of a binary bit can disable the older, duplicate head marker. Alternatively, the PLC can inspect and test a marker, such as a time stamp marker, on each of the data log records, to determine the most recently written record.

At activity 8400, the data log record can be read from the memory device. In an operative embodiment, the data log record can be read from at least one memory segment responsive to the data log structure. Information indicative of the data log structure can be stored separately in the memory device.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, section, abstract, drawing figure, etc.) of this application, unless clearly specified to the contrary, there is no requirement for any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive.

What is claimed is:

1. A method for utilizing a memory cartridge connected to a programmable logic controller (PLC), the memory cartridge comprising a plurality of memory segments, the method comprising a plurality of activities comprising:
   providing a data log file to the memory cartridge, the data log file having a first head marker that is turned on and a second head marker that is turned on;
   comparing a first data log record on the memory cartridge identified by the first head marker and a second data log record on the memory cartridge identified by the second head marker using an error checking technique; and
   determining which of the first head marker and the second head marker is erroneous based on a result of the comparison of the first data log record and the second data log record using the error checking technique.

2. The method of claim 1, wherein the error checking technique comprises using a checksum.

3. The method of claim 1, wherein the error checking technique comprises using a Fletcher checksum.

4. The method of claim 1, wherein said activity of comparing the first data log record and the second data log record takes place responsive to a loss of power to the memory cartridge.

5. The method of claim 1, further comprising:
   determining that the first head marker relating to the first data log record was written subsequently to the second head marker relating to the second data log record; and
   changing the second head marker to a non-head marker.

6. The method of claim 1, further comprising:
   determining that the first head marker relating to the first data log record was written subsequently to a second head marker relating to the second data log record; and
   disabling the second head marker.

7. The method of claim 1, wherein the data log file is written as a logically circular buffer.

8. The method of claim 7, further comprising:
   comparing a position associated with the first head marker to a position associated with the second head marker with respect to a direction of writing of the circular buffer;
   determining that the first head marker was written subsequently to the second head marker; and
   changing the second head marker to a non-head marker.

9. The method of claim 1, further comprising:
   comparing a time stamp associated with the first data log record to a time stamp associated with the second data log record;
   determining that the first head marker was written subsequently to the second head marker; and
   changing the second head marker to a non-head marker.

10. The method of claim 1, further comprising:
automatically reading the data log file, said reading activity subsequent to a received user input regarding an option to erase the data log file after the reading activity, the user input received responsive to a prompt.

11. The method of claim 1, further comprising:
responsive to an affirmative user input to a prompt corresponding to a selection to erase the data log file, erasing the data log file from the memory cartridge.

12. The method of claim 1, further comprising:
responsive to a negative user input corresponding to a selection to erase the data log file, not erasing the data log file from the memory cartridge.

13. The method of claim 1, further comprising:
providing a default selection corresponding to not erasing the data log file after reading the data log file from the memory cartridge.

14. The method of claim 1, further comprising:
providing a default selection corresponding to erasing the data log file after reading the data log file from the memory cartridge.

15. The method of claim 1, further comprising:
writing a third data log record in the data log file responsive to a third head marker, the third head marker indicative of a beginning memory segment for the third data log record to be written in the data log file.

16. The method of claim 1, further comprising:
responsive to a third data log record being written in the data log file, the third data log record associated with a third head marker that is turned on, changing a previous head marker to a record marker in the data log file.

17. The method of claim 1, further comprising:
responsive to the power failure, determining that the first head marker and the second head marker are turned on simultaneously.

18. A method comprising:
responsive to a power failure and based upon a data log structure, comparing a first data log record on a memory cartridge associated with a first marker to a second data log record on the memory cartridge associated with a second marker using an error checking technique, the first data log record and the second data log record being part of a data log file stored on the memory cartridge, the memory cartridge connected to a programmable logic controller (PLC), the memory cartridge comprising a plurality of memory segments, the data log structure stored separately from the data log file on the memory cartridge; and
determining which of the first marker and the second marker is erroneous.

19. A non-transitory computer readable storage medium comprising computer-executable instructions for activities comprising:
responsive to a power failure and based upon a data log structure, comparing a first data log record on a memory cartridge associated with a first marker to a second data log record on the memory cartridge associated with a second marker using an error checking technique, the first data log record and the second data log record being part of a data log file stored on the memory cartridge, the memory cartridge connected to a programmable logic controller (PLC), the memory cartridge comprising a plurality of memory segments, the data log structure stored separately from the data log file on the memory cartridge;
determining which of the first marker and the second marker is erroneous; and automatically reading the data log file, said reading activity subsequent to a received user input regarding an option to erase the data log file after the reading activity, the user input received responsive to a prompt.

* * * * *